US009225738B1

(12) United States Patent
Chiles

(10) Patent No.: US 9,225,738 B1
(45) Date of Patent: Dec. 29, 2015

(54) MARKOV BEHAVIOR SCORING

(71) Applicant: EMC Corporation, Hopkinton, MA (US)

(72) Inventor: Richard Chiles, Castro Valley, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/319,677

(22) Filed: Jun. 30, 2014

(51) Int. Cl.
*G06F 11/00* (2006.01)
*G06F 12/14* (2006.01)
*G06F 12/16* (2006.01)
*G08B 23/00* (2006.01)
*H04L 29/06* (2006.01)

(52) U.S. Cl.
CPC .................. *H04L 63/1425* (2013.01)

(58) Field of Classification Search
CPC ....................................................... H04L 29/08
USPC ............................................................ 726/22
See application file for complete search history.

(56) References Cited

U.S. PATENT DOCUMENTS

| 5,850,448 | A  | * | 12/1998 | Ganesan ........................ 713/184 |
| 7,013,395 | B1 | * | 3/2006  | Swiler et al. ..................... 726/25 |
| 8,516,596 | B2 | * | 8/2013  | Sandoval et al. ................ 726/25 |
| 9,021,583 | B2 | * | 4/2015  | Wittenstein et al. ............. 726/22 |
| 2009/0126023 | A1 | * | 5/2009  | Yun et al. ........................ 726/25 |
| 2009/0141895 | A1 | * | 6/2009  | Anderson et al. ............. 380/252 |
| 2011/0131646 | A1 | * | 6/2011  | Park et al. ....................... 726/13 |
| 2011/0209216 | A1 | * | 8/2011  | Zohar et al. ..................... 726/22 |
| 2011/0214187 | A1 | * | 9/2011  | Wittenstein et al. ............. 726/25 |
| 2012/0047581 | A1 | * | 2/2012  | Banerjee et al. ................. 726/24 |
| 2014/0149569 | A1 | * | 5/2014  | Wittenstein et al. .......... 709/224 |

OTHER PUBLICATIONS

Thomas Weigold; The Zurich Trusted Information Channel—An Efficient Defence against Man-in-the-Middle and Malicious Software Attacks; Dec. 14, 2007; CITESEER; p. 1-10.*

* cited by examiner

*Primary Examiner* — Monjour Rahim
(74) *Attorney, Agent, or Firm* — BainwoodHuang

(57) ABSTRACT

Improved techniques involve flagging anomalous behavior in a current session when there is sufficient difference between an observed distribution of Markov events in the current session and an observed distribution of Markov events in a global session. Here, "Markov events" refer to events such as web page transitions and web page addresses. During a user session, a testing server generates a frequency distribution of a set of Markov events of the user session. The testing server also obtains a frequency distribution of previously observed Markov events of a global session, i.e., sets of sessions of previous user sessions or training sessions. The testing server then computes an anomaly statistic depending on the Markov events that indicates a difference between the user session and the global session. The testing server may produce an alert if the anomaly statistic differs significantly from some nominal value.

20 Claims, 4 Drawing Sheets

MARKOV BEHAVIOR SCORING

BACKGROUND

Websites that provide electronic services receive input from client machines in the form of requests to access content at various addresses. These requests may follow a particular sequence. For example, within a user session, an online banking service may receive, in order, a request to access, in order, a login page, a password page, an account summary page, a transaction history page, a funds transfer page, a confirmation page, and a logout request page.

However, the online banking service and websites like it are susceptible to attacks from malicious actors. For example, in some attacks, malicious code in a browser running on a user computer alters the requests to a web server in a way that avoids detection by the user.

Conventional approaches to detecting attacks from malicious actors involve comparing frequencies of various behaviors in user sessions with predicted frequencies of those behaviors. For example, an administrator may analyze the frequency of a particular viewing order of a web page and compare this frequency to that predicted by a statistical model. If the frequency in the user session exceeds the predicted frequency, an administrator labels the user session as suspect.

SUMMARY

Unfortunately, there are deficiencies with conventional approaches to detecting attacks from malicious actors. For example, such approaches can miss anomalies occurring in short sessions (e.g., those having fewer than seven or eight page requests in the user session). Further, these approaches only consider as anomalous behaviors that occur with excessive frequency within a user session. Further still, these approaches consider sparse occurrences of a behavior as being typical when they may indeed indicate anomalous behavior.

In contrast with the above-described conventional approaches to detecting attacks from malicious actors, improved techniques involve flagging anomalous behavior in a current session when there is sufficient difference between an observed distribution of Markov events in the current session and an observed distribution of Markov events in a global session. Here, "Markov events" refer to events such as web page transitions and web page addresses. During a user session, a testing server generates a frequency distribution of a set of Markov events of the user session. The testing server also obtains a frequency distribution of previously observed Markov events of a global session, i.e., sets of sessions of previous user sessions or training sessions. The testing server then computes an anomaly statistic depending on the Markov events that indicates a difference between the user session and the global session. The testing server may produce an alert if the anomaly statistic differs significantly from some nominal value.

Advantageously, the improved techniques allow the testing server to detect anomalies in current sessions when the sessions are short and/or are missing web pages or page transitions. For example, if a user session for the online banking service is missing the transition between the account summary page and the funds transfer page, the testing server may flag the user session as exhibiting anomalous behavior.

One embodiment of the improved techniques is directed to a method of identifying suspect access to a web server in a computing environment. The method includes receiving, by a testing server, user input during a current session, the user input indicating a web page address, a session including a collection of web page addresses arranged in temporal order. The method also includes generating a session frequency distribution, the session frequency distribution being a frequency of each of a set of Markov events of the current session, each of the set of Markov events including at least one of i) a web page address of a set of web page addresses at which content is made available to the user by the web server, and ii) a web page transition including a source page address of the set of web addresses and a target page address of the set of web addresses. The method further includes obtaining a global frequency distribution, the global frequency distribution being a frequency of each of a set of Markov events of a global session containing a collection of previous sessions. The method further includes performing, by the testing server, a comparison operation on the session frequency distribution and the global frequency distribution to produce an anomaly statistic indicative of a difference between the session frequency distribution and the global frequency distribution. The method further includes sending, in response to the anomaly statistic indicating that the current session exhibits anomalous user behavior, an alert to a security entity to indicate that suspect activity has been identified.

Additionally, some embodiments of the improved technique are directed to a system constructed and arranged to identify suspect access to a web server in a computing environment. The apparatus includes memory and a controller including controlling circuitry constructed and arranged to carry out the method of identifying suspect access to a web server in a computing environment.

Furthermore, some embodiments of the improved technique are directed to a computer program product having a non-transitory computer readable storage medium that stores code including a set of instructions which, when executed by a computer, cause the computer to carry out the method of identifying suspect access to a web server in a computing environment.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques involve flagging anomalous behavior in a current session when there is sufficient difference between an observed distribution of Markov events in the current session and an observed distribution of Markov events in a global session. Advantageously, the improved techniques allow the testing server to detect anomalies in current sessions when the sessions are short and/or are missing web pages or page transitions.

Figure 1:
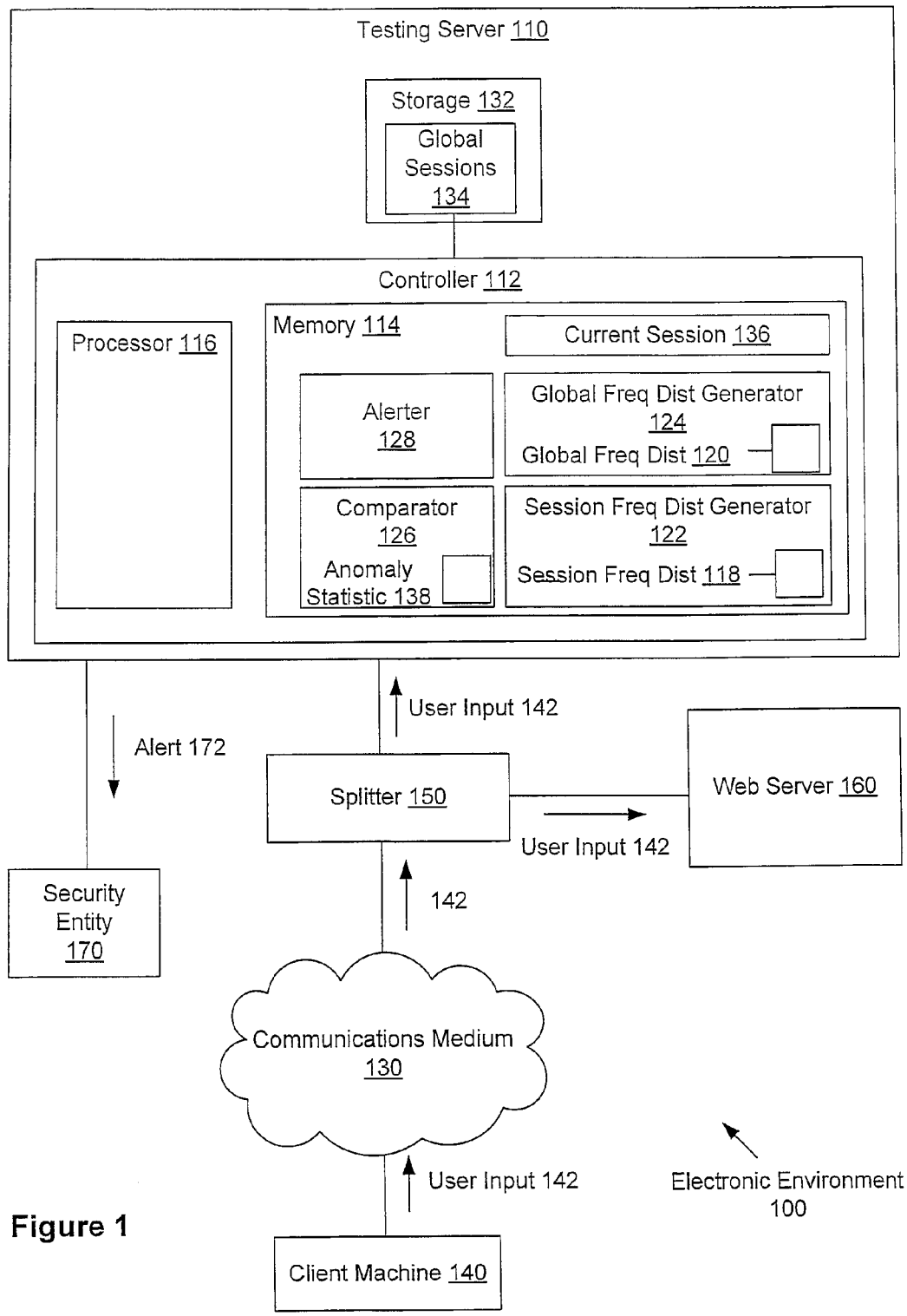
FIG. 1 is a block diagram illustrating an example electronic environment in which the improved technique is carried out.

FIG. 1 illustrates an example electronic environment 100 in which the improved techniques hereof can be carried out. Electronic environment 100 includes testing server 110, communication medium 130, storage device 132, client machine 140, splitter 150, web server 160, and security entity 170.

Testing server 110 is configured to identify suspect access to web server 160. In the example shown, the testing server 110 is implemented within a computer that includes a controller 112 that contains memory 114 and a processor 116 coupled to memory 114. The computer hosting testing server 110 typically shares a local area network (LAN) with web server 160, although this is by no means a requirement. Although the computer hosting testing server 110 is shown as being separate from splitter 150 and web server 160, this is not required. In some arrangements, testing server 110, splitter 150, and web server 160 may be integrated within a single device or among multiple devices in any suitable manner.

Processor 116 is configured to execute instructions stored in memory 114. Processor 116 takes the form of a set of CPUs, such as one or more single core or multiple core processing chips or assemblies.

Memory 114 is configured to store various software constructs running on testing server 110, such as session frequency distribution generator 122, global frequency distribution generator 124, comparator 126, and alerter 128. Memory 114 is further configured to store data generated by these modules, such as session frequency distribution 118 and global frequency distribution 120. Memory 114 may include both volatile memory (e.g., RAM) and non-volatile memory, e.g., one or more flash drives and/or disk drives.

Session frequency distribution generator 122, when executed by processor 116, causes processor 116 to generate a session frequency distribution of Markov events 118.

Global frequency distribution generator 124, when executed by processor 116, causes processor 116 to generate a global frequency distribution of Markov events 120.

Comparator 126, when executed by processor 116, causes processor 116 to perform a comparison operation between a session frequency distribution 118 and a global frequency distribution 120. In doing so, processor 116 computes an anomaly statistic based on when the Markov events are individual web page requests or web page transitions (e.g., an ordered pair of a source web page and a target web page).

Alerter 128, when executed by processor 116, causes processor 116 to send an alert 172 to a security entity 170 in response to the testing indicating that the user session exhibits anomalous behavior. Alert 172 to security entity 170 indicates that suspect activity has been identified.

Communications medium 130 provides network connections between client machine 140 and splitter 150. Communications medium 130 may implement any of a variety of protocols and topologies which are in common use for communications over the internet. Furthermore, communications medium 130 may include various components (e.g., cables, switches/routers, gateways/bridges, etc.) that are used in such communications.

Client machine 140 is configured to generate user input 142 from a human user or an automated program running on the client machine 140, e.g., a Man-in-the-Browser (MitB). Client machine 140 may be any type of computing device capable of generating user input 142, such as a desktop computer, a laptop computer, a tablet computer, a smartphone, and the like.

Splitter 150 is configured to receive user input 142 and to route user input 142 to web server 160 and testing server 110. In an example, splitter 150 is located separately from web server 160 and testing server 110. For example, splitter 150 may be a dedicated appliance. In some arrangements, however, splitter 150 may be embedded within a router. In other arrangements, splitter 150 may be embedded within web server 160 or testing server 110, or located elsewhere.

Web server 160 is configured to receive user input 142 for providing electronic services to client machines, such as client machine 140.

Security entity 170 is configured to receive and act upon alert 172. For example, security entity 170 may perform an investigation to determine the origin of the generation of the stream of clicks 142. Security entity 170 may take the form of a computer operated by an administrator of web server 160, although other forms, such as software embedded within testing server 110, are possible.

During operation, client machine 140 generates user input 142 in response to input received from a human user or an automated program such as a MitB. A human user might generate input 142 using an I/O device such as mouse, keyboard, touchpad, microphone, camera, or the like, to click on hyperlinks displayed on web pages in a browser or other web-enabled program running on client machine 140. An automated program, such as a MitB, however, may cause client machine 140 to issue input 142 directly, i.e., without the use of an I/O device.

Client machine 140 sends user input 142 to web server 160 over communications medium. Splitter 150 receives user input 142 from communications medium 130, and routes user input 142 to both testing server 110 and web server 160. Upon receipt of user input 142, web server 160 processes the requests indicated by user input 142 as usual.

Upon receipt of input 142 from splitter 150, processor 116 places user input 142 at the end of a current session 136 in memory 114. If no current session is in memory 116, processor 116 creates a new current session 136 in memory 114. Current session 136, then, is a collection of web page addresses, or web pages, representing a user's real-time activity. In some arrangements, however, current session 136 may be retrieved from storage device 132 and is not real-time activity.

When current session 136 represents real-time activity, processor 116 generates a session frequency distribution 120 upon receipt of user input 142. Current session frequency distribution 118 represents a frequency distribution of certain Markov events within current session 136. For example, when a Markov event is simply a state of being at a particular web page, then current frequency distribution 118 is a frequency of occurrences of web pages in current session 136. However, if a Markov event is taken to be a transition to a target web page from a source web page, then current frequency distribution 118 is a frequency of occurrences of web page transitions in current session 136. Note that when there are N possible web pages made available by web server 160, then there are $N^2$ possible web page transitions.

Either upon the generation of current frequency distribution 118, or at some point earlier, processor 116 obtains global sessions 134 from storage device 132 and generates global frequency distribution 118 for the same Markov process as for current frequency distribution 116. It should be understood that global sessions 134 might represent a set of historical and/or training sessions that indicate typical user sessions.

Once current frequency distribution 118 and global frequency distribution 118 are available in memory 114, processor 116 performs a comparison operation on current frequency distribution 118 and global frequency distribution 118. The result of this comparison operation is an anomaly statistic 138 that indicates the degree of anomalous behavior exhibited in current session 136. An example of such a comparison operation is the formation of a chi-squared ($\chi^2$) statistic 138 that provides a weighted sum over the square of the difference between respective frequencies of current frequency distribution 118 and global frequency distribution 120. Another example of such a comparison operation is the formation of a log-likelihood ratio (LLR) 138 of respective probabilities that the current session has current frequency distribution 118 based on current and global atomic event probabilities.

If anomaly statistic 138 significantly differs from some nominal value (typically zero), then processor 116 sends an alert 172 to security entity 170. Alert 172 indicates that user input 142, or current session 118, may have been generated by a suspect party. If, however, anomaly statistic 138 is sufficiently close to the nominal value, then processor 116 may not send any alert.

Figure 2:
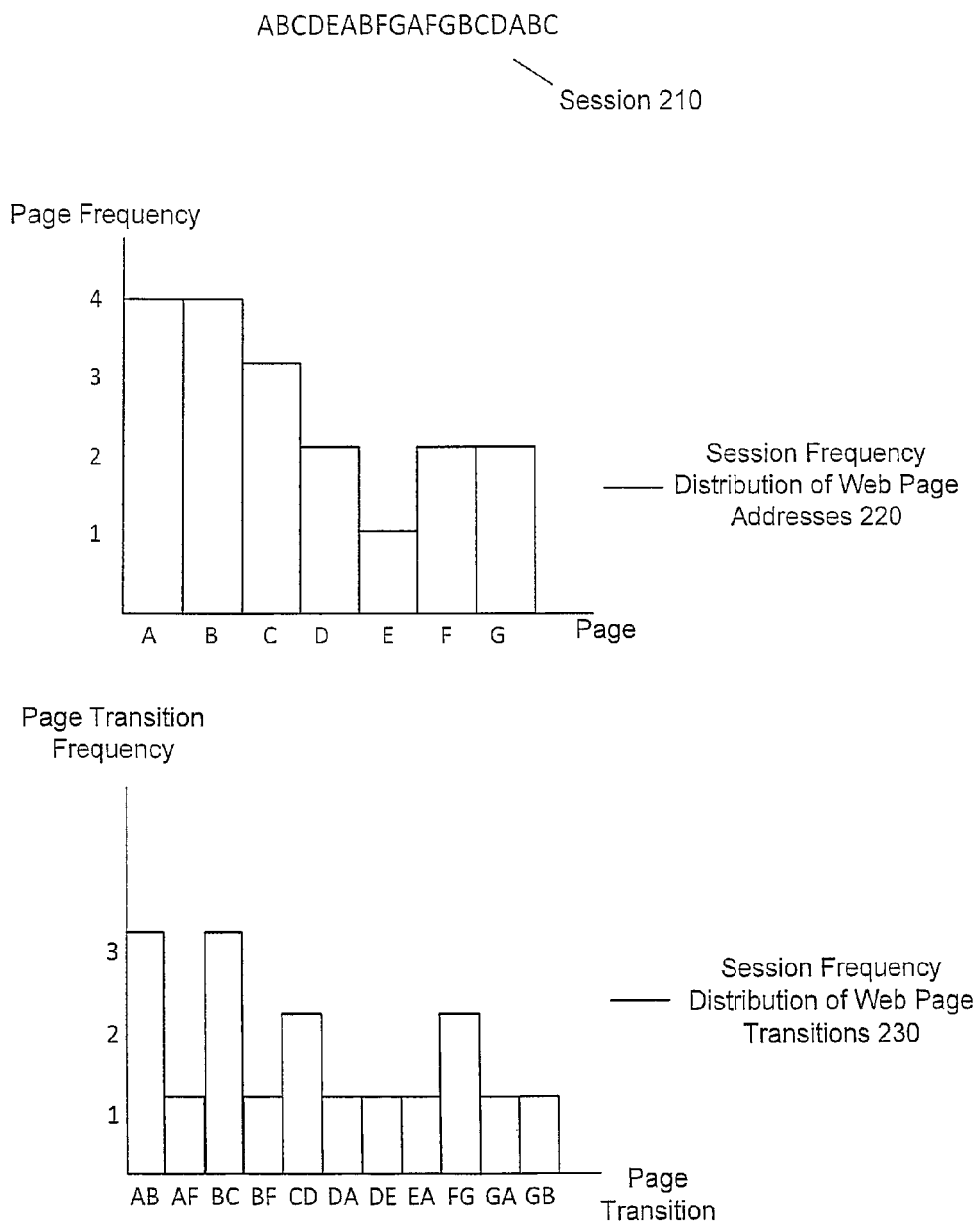
FIG. 2 is a block diagram illustrating an example distribution of pages and page transitions within the electronic environment shown in FIG. 1.

FIG. 2 illustrates frequency distributions of a session for both the cases where a Markov event is a web page (top) and a web page transition (bottom). Session 210 may represent either a current session 118 or a global session 120. As expressed in FIG. 2, session 210 is depicted as a set of characters, with each character representing a different web page.

Session frequency distribution 220 of web pages, as expressed in FIG. 2, is a number of occurrences of each web page in session 210. In this example, there are four instances of web site "A", four instances of web site "B", 3 instances of web site "C", and so on.

Session frequency distribution 230 of web page transitions, as expressed in FIG. 2, is a number of occurrences of each web page transition in session 210. Note that each transition is an ordered pair of characters representing the web pages. Thus, "AB" represents a transition from web page "A" to web page "B", "BC" represents a transition from web page "B" to web page "C", and so on. In FIG. 2, there are three instances of transition "AB", one instance of transition "BC", and so on.

It should be understood, however, that the distributions 220 and 230 may not represent all possible web pages and web page transitions offered by web server 160 (FIG. 1). For example, even if web pages "A" through "G" represented all seven web pages offered by web server 160, then histogram 230 does not contain information about all 49 (seven squared) possible transitions. Rather, distribution 230 shows only those transitions having a non-zero frequency.

Figure 3:
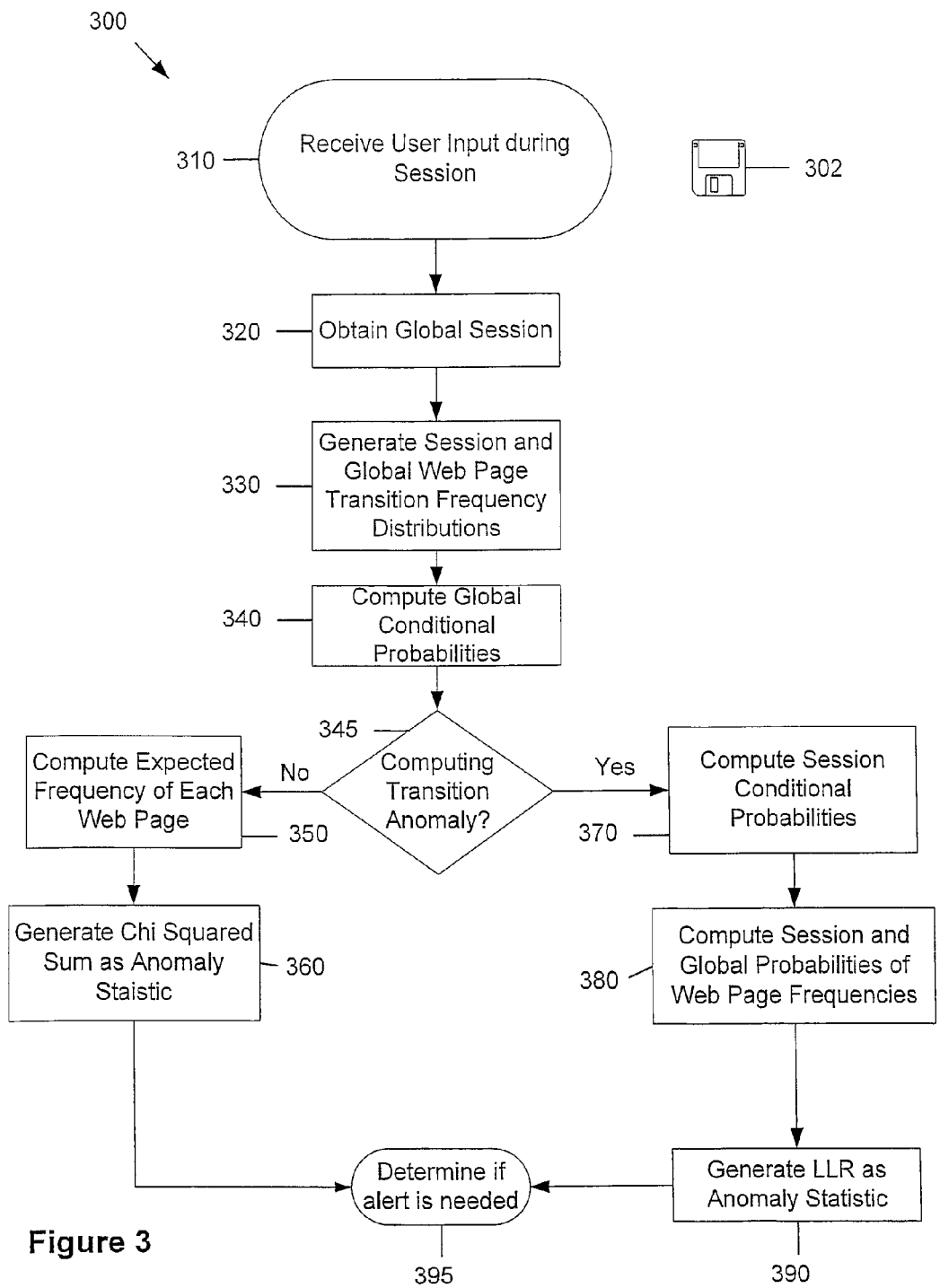
FIG. 3 is a flow chart illustrating an example anomaly statistic computation carried out by the processor in the testing server within the electronic environment shown in FIG. 1.

FIG. 3 illustrates an example detailed process 300 for detecting suspect access to web server 160. In step 310, processor 116 receives user input 142 during current session 136. In some arrangements, user input 142, as received by processor 116, is not a complete request for electronic services from web server 160 but rather metadata pertaining to the request. The metadata occupies little memory, but contains enough information to distinguish unique web pages. Once processor 116 receives user input 142, processor 116 adds user input to current session 136.

In step 320, processor 116 obtains global sessions 134 from storage device 132. Global sessions 134 are a set of typical user sessions that do not exhibit anomalous behavior.

In step 330, processor 116 generates session frequency distribution 118 and global frequency distribution 120 from respective current session 136 and global session 134. Typically, frequency distributions 118 and 120 each take the form represented in example distributions 220 and 230, depending on the Markov event being analyzed by processor 116. Thus, step 330 represents a counting step for processor 116.

In step 340, processor 116 computes a global conditional probability $p_{GAB}$ for each possible web page transition offered by web server 160. Processor 116 computes this global conditional probability regardless of whether the Markov events being analyzed are web pages or web page transitions. For a transition from web page "A" to web page "B", processor 116 computes the global conditional probability as $$p_{GAB} = \frac{n_{AB}}{n_A},$$

where $n_A$ is the total frequency of source web pages in the set of sessions of the global session 134, and $n_{AB}$ is the frequency of web page transitions from web page "A" to web page "B" in global session 134. Processor 116 computes $p_{GAB}$ for all target web pages and source web pages in global session 134.

In step 345, processor 116 determines whether the Markov event under consideration is a web page or a web page transition. If the Markov event is a web page, then processor 116 proceeds to step 350. If instead the Markov event is a web page transition, then processor 116 proceeds to step 370.

In step 350, processor 116 computes an expected frequency $\hat{n}_B$ of each target web page made available by web server 160. In some arrangements, the expected frequency $\hat{n}_B$ takes the following form:

$$\hat{n}_B = \sum_A p_{GAB} n_A,$$

where the sum is over all source web pages offered by web server 160. The expected frequency represents the frequency at which a typical session visits each web page offered by web server 160. In some arrangements, however, a typical session may vary between different users.

In step 360, processor 116 generates a $\chi^2$ anomaly statistic 138. In some arrangements, the $\chi^2$ anomaly statistic 138 takes the following form:

$$\chi^2 = \sum_B \frac{(n_B - \hat{n}_B)^2}{\hat{n}_B}.$$

It should be understood that, for this particular form of anomaly statistic 138, processor 116 penalizes current session 136 equally whether it visits a web page too frequently or not frequently enough (e.g., missing web pages).

In step 370, processor 116 computes session conditional probabilities for each possible web page transition offered by web server 160. Session conditional probabilities are analogous to global conditional probabilities, with each frequency being measured from current session 136 rather than global session 134.

In step 380, processor 116 computes the probability that the current session obeys statistics determined from current session 136, and the probability that the current session obeys statistics determined from global session 134. Processor 116 thus verifies whether the current session 136 obeys the same statistical behavior as the global session 134. In some arrangements, these statistics assume that the frequency distribution of the current session 134 is a multinomial-distributed random variable, as follows:

$$P_A(k_{A1}, \ldots, k_{An}; p_{A1}, \ldots, p_{An}) = \frac{n_A!}{k_{A1}! \ldots k_{An}!} p_{A1}^{k_{A1}} \ldots p_{An}^{k_{An}},$$

The set $\{A1, \ldots An\}$ represents all observed page transitions observed in the session. For example, the set in FIG. 2 contains page transitions $\{AB, AF, BC, \ldots GB\}$. $k_{A1}$ is the frequency of web page transitions observed in current session 136 from source page 'A" to a first web page, and so on. $p_{A1}$ is an atomic probability of this respective web page transition; for the global session statistics, this is simply the global conditional probability $p_{GA1}$ and for the current session statistics, this is the session conditional probability $p_{SA1}$ The overall probability is a product over all source web pages "A".

In step 390, processor 116 computes, as the anomaly statistic 138, the log-likelihood ratio (LLR) that the current session is significantly different from the global session, using the following expression that follows from the above multinomial expression:

$$LLR = \sum_{A,B} k_{AB} \log \frac{p_{GAB}}{p_{SAB}}.$$

In step 395, processor 116 determines from the value of the computed anomaly statistic 138, whether to produce an alert 172 that current session 136 may exhibit anomalous behavior. If processor 116 determines that alert 172 is needed based on computed anomaly 138 taking a value significantly different from zero, then processor 116 sends alert 172 to security entity 170.

It should be understood that, while the above steps represents a best approach to computing the anomaly statistic 138 for the cases of Markov events described, the LLR and $\chi^2$ approaches may be used for either Markov event type. Thus, in some arrangements, each of the anomaly statistic for web pages and web page transitions may be computed using the LLR approach for both, the $\chi^2$ approach for both, or they may be switched around. In other arrangements, processor 116 may compute the anomaly statistic when a Markov event is a linear combination of web pages and web page transition; in this case, the approach to computing the anomaly statistic for each of the web pages and web page transitions would be the same.

Figure 4:
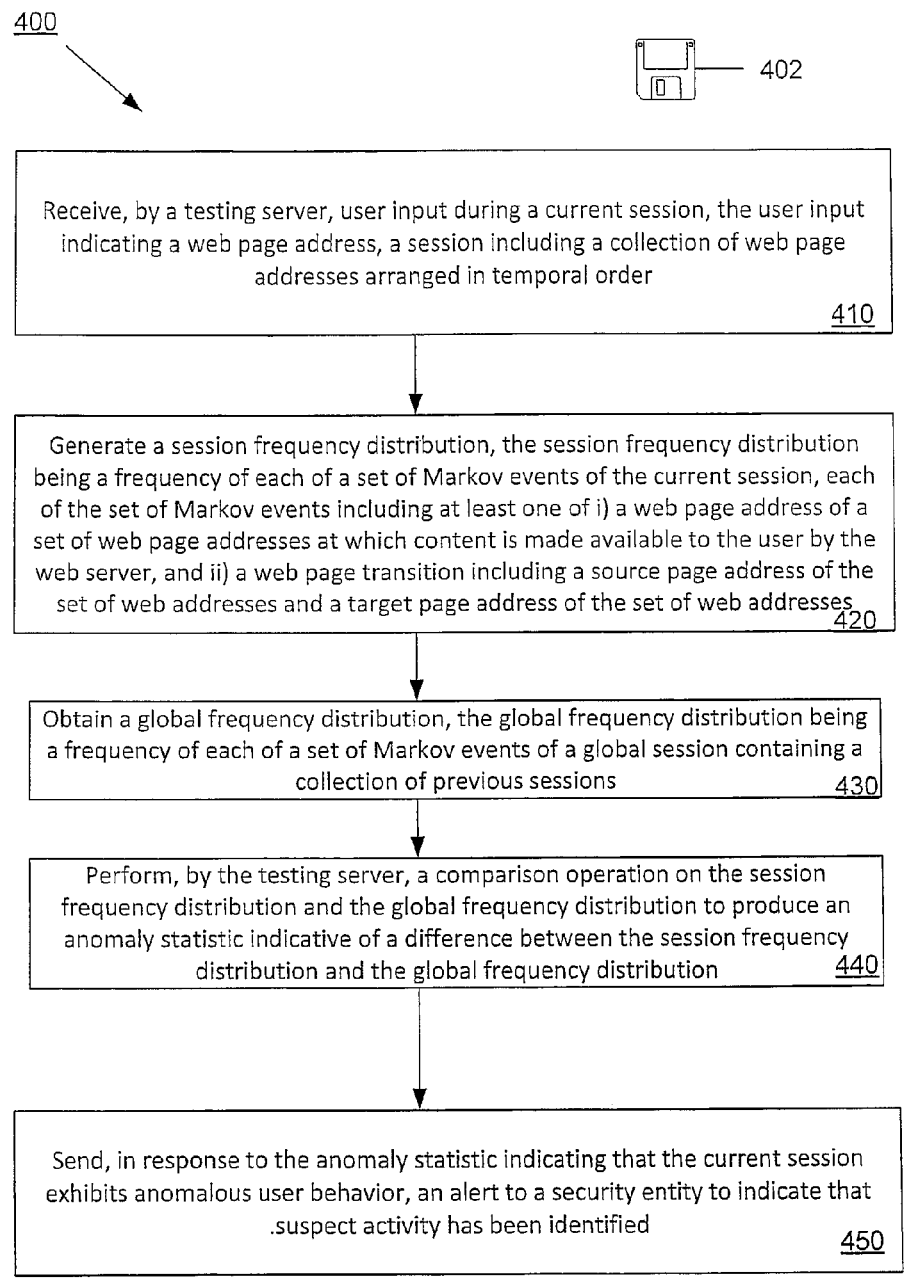
FIG. 4 is a flow chart illustrating an example method of carrying out the improved technique within the electronic environment shown in FIG. 1.

FIG. 4 illustrates a method 400 of detecting suspect access to a web server in a computing environment, including steps 410, 420, 430, 440, and 450.

In step 410, processor 116 receives user input during a current session, the user input indicating a web page address, a session including a collection of web page addresses arranged in temporal order. User input 142, as received by processor 116, is not a complete request for electronic services from web server 160 but rather the metadata of the request. The metadata occupies little memory, but contains enough information to distinguish unique web pages. Once processor 116 receives user input 142, processor 116 adds user input to current session 136.

In step 420, processor 116 generates, as a session frequency distribution, a frequency of each of a set of Markov events of the current session, each of the set of Markov events including at least one of i) a web page address of a set of web page addresses at which content is made available to the user by the web server, and ii) a web page transition including a source page address of the set of web addresses and a target page address of the set of web addresses. The frequency distributions take the form of histograms as illustrated in FIG. 2, for each of web pages (220) and web page transitions (230).

In step 430, processor 116 obtains, as a global frequency distribution, a frequency of each of a set of Markov events of a global session containing a collection of previous sessions.

In step 440, processor 116 performs, by the testing server, a comparison operation on the session frequency distribution and the global frequency distribution to produce an anomaly statistic indicative of a difference between the session frequency distribution and the global frequency distribution. Anomaly statistic as described herein takes the form of a $\chi^2$ expression in the case of web pages or a LLR expression in the case of web page transitions. Also, it was assumed herein that the frequency distribution of the current session is a multinomial-distributed random variable, but this is by no means a requirement.

In step 450, processor 116 sends, in response to the anomaly statistic indicating that the current session exhibits anomalous user behavior, an alert to a security entity to indicate that suspect activity has been identified.

Improved techniques involve flagging anomalous behavior in a current session when there is sufficient difference between an observed distribution of Markov events in the current session and an observed distribution of the Markov events in a global session. An example of such techniques has been described here in terms of testing server 110 and its components. Testing server 110 is able to accomplish such techniques by implementing statistical techniques for comparing frequency distributions of current session 136 and global session 134. Using these techniques, processor 116 is able to monitor sessions such as current session 134 with less risk of false negatives because anomaly statistic 138 penalizes both excessive and deficient frequencies.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to testing server 110, which is constructed and arranged to identify suspect access to a web server in a computing environment. Some embodiments are directed to a process of identifying suspect access to a web server in a computing environment. Also, some embodiments are directed to a computer program product that enables computer logic to cause a computer to identify suspect access to a web server in a computing environment.

In some arrangements, testing server 110 is implemented by a set of cores or other types of control/processing circuitry running software. In such arrangements, the software instructions can be delivered, within testing server 110, either in the form of a computer program product 302 and 402, or simply instructions on disk or pre-loaded in memory 114 of testing server 110, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of detecting suspect access to a web server in a computing environment, the method comprising:
receiving, by a testing server, user input during a current session from a client machine over a network, the user input indicating a web page address, a session including a collection of web page addresses arranged in temporal order;

generating, by the testing server, a session frequency distribution, the session frequency distribution being a frequency of each of a set of Markov events of the current session, each of the set of Markov events including at least one of i) a web page address of a set of web page addresses at which content is made available to the user by the web server, and ii) a web page transition including a source page address of the set of web addresses and a target page address of the set of web addresses;

obtaining, by the testing server, a global frequency distribution, the global frequency distribution being a frequency of each of a set of Markov events of a global session containing a collection of previous sessions;

performing, by the testing server, a comparison operation on the session frequency distribution and the global frequency distribution to produce an anomaly statistic indicative of a difference between the session frequency distribution and the global frequency distribution; and sending, in response to the anomaly statistic indicating that the current session exhibits anomalous user behavior, an alert to a security entity to indicate that suspect activity has been identified.

2. A method as in claim 1, wherein receiving the user input includes obtaining the user input from a splitter located on a same local network as the web server, the splitter providing duplicates of the user input to both i) the web server and ii) the testing server.

3. A method as in claim 1, wherein performing the comparison operation includes:
computing, for each of a set of web page transitions, a global conditional probability of user input indicating the target page address of that web page transition given previous user input indicating the source page address of that web page transition, the global conditional probability being a ratio of the frequency of that web page transition of the global session to a frequency of the target web address; and
producing the anomaly statistic based on the global conditional probability for each of the set of web page transitions of the global session.

4. A method as in claim 3, wherein the set of Markov events includes the set of web page transitions; and
wherein producing the anomaly statistic includes:
computing, for each of the set of web page transitions, a session conditional probability of user input indicating the target page address of that web page transition given the previous user input indicating the source page address of that web page transition, the session conditional probability being a ratio of the frequency of that web page transition of the current session to a frequency of the target web address; and
generating, for each of the set of web page transitions, a ratio of session conditional probability to the global conditional probability, the ratio for each of the web page transitions forming a basis for comparing the session frequency distribution and the global frequency distribution.

5. A method as in claim 4, wherein producing the anomaly statistic further includes:
forming, for each of the set of web page transitions, a first probability that the current session has the session frequency distribution of the set of web page transitions;
forming, for each of the set of web page transitions, a second probability that the current session has the global frequency distribution of the set of web page transitions; and
computing a likelihood ratio that the current session is anomalous from the ratio of the second probability to the first probability.

6. A method as in claim 5, wherein the frequencies of the set of web page transitions is a multinomial distributed random variable;
wherein producing the anomaly statistic further includes computing a logarithm of the likelihood ratio to form a log-likelihood ratio (LLR); and
wherein sending the alert to the security entity includes evaluating whether the absolute value of the LLR is greater than a threshold value of the LLR.

7. A method as in claim 3, wherein the set of Markov events includes the set of web page addresses; and
wherein producing the anomaly statistic includes:
computing an expected frequency of each of the set of web page addresses; and
producing, for each of the set of web page addresses, a numerical difference between the frequency of that web page address and the expected frequency; and
generating a sum over each of the set of web page addresses of a ratio of a square of the numerical difference for that web page address and the expected frequency of that web page address to form a chi squared statistic for the set of web page addresses over the current session.

8. A method as in claim 7, wherein computing the expected frequency of a target web page address includes generating a sum over each of the web page addresses of a product of the frequency of that web page address and the global conditional probability of user input indicating the target web page address given the previous user input indicating that web page address.

9. A method as in claim 1, wherein the Markov events includes both web pages and web transitions, and producing the anomaly statistic involves a forming a linear combination of anomaly statistics for each of the set of web pages and the set of web page transitions.

10. A method as in claim 1, wherein receiving the user input during the current session includes obtaining the user input in real time.

11. A system constructed and arranged to identify suspect access to a web server in a computing environment, the system comprising a testing server including a controller, the controller including memory and controlling circuitry coupled to the memory, the controlling circuitry being constructed and arranged to:
receive user input during a current session, the user input indicating a web page address, a session including a collection of web page addresses arranged in temporal order;
generate a session frequency distribution, the session frequency distribution being a frequency of each of a set of Markov events of the current session, each of the set of Markov events including at least one of i) a web page address of a set of web page addresses at which content is made available to the user by the web server, and ii) a web page transition including a source page address of the set of web addresses and a target page address of the set of web addresses;

obtain a global frequency distribution, the global frequency distribution being a frequency of each of a set of Markov events of a global session containing a collection of previous sessions;

perform a comparison operation on the session frequency distribution and the global frequency distribution to produce an anomaly statistic indicative of a difference between the session frequency distribution and the global frequency distribution; and send, in response to the anomaly statistic indicating that the current session exhibits anomalous user behavior, an alert to a security entity to indicate that suspect activity has been identified.

12. The system as in claim 1, wherein the controlling circuitry constructed and arranged to receive the user input is further constructed and arranged to obtain the user input from a splitter located on a same local network as the web server, the splitter providing duplicates of the user input to both i) the web server and ii) the testing server.

13. A computer program product comprising a non-transitory, computer-readable storage medium which stores executable code, which, when executed by a testing server, causes the computing device to perform a method of identifying suspect access to a web server in a computing environment, the method comprising:

receiving, by a testing server, user input during a current session, the user input indicating a web page address, a session including a collection of web page addresses arranged in temporal order;

generating a session frequency distribution, the session frequency distribution being a frequency of each of a set of Markov events of the current session, each of the set of Markov events including at least one of i) a web page address of a set of web page addresses at which content is made available to the user by the web server, and ii) a web page transition including a source page address of the set of web addresses and a target page address of the set of web addresses;

obtaining a global frequency distribution, the global frequency distribution being a frequency of each of a set of Markov events of a global session containing a collection of previous sessions;

performing, by the testing server, a comparison operation on the session frequency distribution and the global frequency distribution to produce an anomaly statistic indicative of a difference between the session frequency distribution and the global frequency distribution; and sending, in response to the anomaly statistic indicating that the current session exhibits anomalous user behavior, an alert to a security entity to indicate that suspect activity has been identified.

14. A computer program product as in claim 13, wherein receiving the user input includes obtaining the user input from a splitter located on a same local network as the web server, the splitter providing duplicates of the user input to both i) the web server and ii) the testing server.

15. A computer program product as in claim 13, wherein performing the comparison operation includes:

computing, for each of a set of web page transitions, a global conditional probability of user input indicating the target page address of that web page transition given the previous user input indicating the source page address of that web page transition, the global conditional probability being a ratio of the frequency of that web page transition of the global session to a frequency of the target web address; and producing the anomaly statistic based on the global conditional probability for each of the set of web page transitions of the global session.

16. A computer program product as in claim 15, wherein the set of Markov events includes the set of web page transitions; and wherein producing the anomaly statistic includes:

computing, for each of the set of web page transitions, a session conditional probability of user input indicating the target page address of that web page transition given the previous user input indicating the source page address of that web page transition, the session conditional probability being a ratio of the frequency of that web page transition of the current session to a frequency of the target web address; and generating, for each of the set of web page transitions, a ratio of session conditional probability to the global conditional probability, the ratio for each of the web page transitions forming a basis for comparing the session frequency distribution and the global frequency distribution.

17. A computer program product as in claim 16, wherein producing the anomaly statistic further includes:

forming, for each of the set of web page transitions, a first probability that the current session has the session frequency distribution of the set of web page transitions;

forming, for each of the set of web page transitions, a second probability that the current session has the global frequency distribution of the set of web page transitions; and computing a likelihood ratio that the current session is anomalous from the ratio of the second probability to the first probability.

18. A computer program product as in claim 17, wherein the frequencies of the set of web page transitions is a multinomial distributed random variable;

wherein producing the anomaly statistic further includes computing a logarithm of the likelihood ratio to form a log-likelihood ratio (LLR); and wherein sending the alert to the security entity includes evaluating whether the absolute value of the LLR is greater than a threshold value of the LLR.

19. A computer program product as in claim 15, wherein the set of Markov events includes the set of web page addresses; and wherein producing the anomaly statistic includes:

computing an expected frequency of each of the set of web page addresses; and producing, for each of the set of web page addresses, a numerical difference between the frequency of that web page address and the expected frequency; and generating a sum over each of the set of web page addresses of a ratio of a square of the numerical difference for that web page address and the expected frequency of that web page address to form a chi squared statistic for the set of web page addresses over the current session.

20. A computer program product as in claim 19, wherein computing the expected frequency of a target web page address includes generating a sum over each of the web page addresses of a product of the frequency of that web page address and the global conditional probability of user input indicating the target web page address given the previous user input indicating that web page address.

* * * * *